United States Patent [19]

Lillybeck

[11] Patent Number: 5,401,464
[45] Date of Patent: Mar. 28, 1995

[54] SOLID STATE REACTION OF SILICON OR MANGANESE OXIDES TO CARBIDES AND THEIR ALLOYING WITH FERROUS MELTS

[75] Inventor: Norman P. Lillybeck, Moline, Ill.

[73] Assignee: Deere & Company, Moline, Ill.

[21] Appl. No.: 161,436

[22] Filed: Dec. 6, 1993

Related U.S. Application Data

[60] Division of Ser. No. 855,077, Mar. 23, 1992, abandoned, which is a division of Ser. No. 614,990, Nov. 13, 1990, abandoned, which is a continuation of Ser. No. 167,319, Mar. 11, 1988, abandoned.

[51] Int. Cl.[6] .............................................. C22C 33/04
[52] U.S. Cl. ..................................... 420/581; 420/590
[58] Field of Search ................................ 420/581, 590

[56] References Cited

U.S. PATENT DOCUMENTS

| | | | |
|---|---|---|---|
| 492,767 | 2/1883 | Acheson . | |
| 981,280 | 1/1911 | Jones | 75/503 |
| 1,172,659 | 2/1916 | Allen | 51/308 |
| 1,660,144 | 2/1928 | White | 423/345 |
| 2,131,102 | 9/1938 | Fränkl | 23/208 |
| 2,178,773 | 11/1939 | Benner et al. | 23/208 |
| 2,621,118 | 12/1952 | Cyr et al. | 423/139 |
| 2,729,542 | 1/1956 | Van Der Pyl | 23/208 |
| 3,236,673 | 2/1966 | O'Connor et al. | 106/288 |
| 3,309,196 | 3/1967 | Kaneko et al. | 75/94 |
| 3,343,920 | 9/1967 | Lowe | 23/277 |
| 3,375,073 | 3/1968 | McMullen | 23/204 |
| 3,407,059 | 10/1968 | Blaha | 75/503 |
| 3,440,041 | 4/1969 | Kallenbach et al. | 75/152 |
| 3,480,395 | 11/1969 | McMullen et al. | 23/208 |
| 3,672,871 | 6/1972 | Brown et al. | 75/58 |
| 3,704,114 | 11/1972 | Wilson et al. | 75/3 |
| 3,802,864 | 4/1974 | Kusama et al. | 75/5 |
| 3,920,446 | 11/1975 | Irani | 75/51 |
| 3,953,196 | 4/1976 | Obenchain | 75/38 |
| 3,988,646 | 12/1976 | Weaver | 106/44 |
| 3,999,981 | 12/1976 | Brandstatter | 423/440 |
| 4,004,916 | 1/1977 | Kreiger | 75/3 |
| 4,022,615 | 5/1977 | Wells, III et al. | 75/130 |
| 4,044,110 | 8/1977 | Noakes et al. | 423/346 |
| 4,105,457 | 8/1978 | Pietsch et al. | 106/78 |
| 4,106,929 | 8/1978 | Saito et al. | 75/130.5 |
| 4,128,417 | 12/1978 | Lung | 75/129 |

(List continued on next page.)

FOREIGN PATENT DOCUMENTS

| | | | |
|---|---|---|---|
| 268220 | 6/1966 | Australia | 75/625 |
| 752292 | 2/1967 | Canada | 423/440 |
| 1395946 | 3/1965 | France . | |
| 2722866 | 12/1977 | Germany . | |
| 52-13500 | 2/1977 | Japan | 423/345 |
| 52-46398 | 4/1977 | Japan | 423/345 |
| 59-190208 | 10/1984 | Japan | 423/345 |
| 223214 | 12/1984 | Japan . | |
| 61-6117 | 1/1986 | Japan | 423/345 |
| 61-127615 | 6/1986 | Japan | 423/345 |
| 161337 | 9/1957 | Sweden | 423/439 |
| 2022069 | 12/1979 | United Kingdom . | |
| 2175577A | 12/1986 | United Kingdom . | |

OTHER PUBLICATIONS

Chemical Abstracts, vol. 83, No. 6, 11 Aug. 1975, (Columbus, Ohio, US), p. 118, Abstract 45410p.

Metallurgical Transactions B, vol. 17B, No. 3, Sep. 1986, (Warrendale, Pa., (USA), M. Nagamori et al.: "Thermodynamics of the Si–C–O System for the Production of Silicon Carbide and Metallic Siliocn", pp. 503–514.

Primary Examiner—Melvyn J. Andrews
Attorney, Agent, or Firm—Burns, Doane, Swecker & Mathis

[57] ABSTRACT

Manganese or silicon carbide is formed in a solid state reaction by mixing manganese or silicon oxide particles with carbonaceous material (e.g., coke) particles. The materials may be formed into agglomerates including excess carbonaceous material and heated in a suitable reactor vessel. An iron source, such as pig iron and/or iron scrap, can also be added. In that case, the manganese or silicon carbide dissolves in molten iron to produce ferrosilicon or ferromanganese alloys.

17 Claims, 2 Drawing Sheets

U.S. PATENT DOCUMENTS

| | | | |
|---|---|---|---|
| 4,154,787 | 5/1979 | Brown | 264/60 |
| 4,155,753 | 5/1979 | Ryabchikov et al. | 75/129 |
| 4,168,966 | 9/1979 | Furui et al. | 75/3 |
| 4,219,519 | 8/1980 | Goksel | 264/82 |
| 4,231,798 | 11/1980 | Schramm et al. | 75/256 |
| 4,238,434 | 12/1980 | Enomoto et al. | 264/63 |
| 4,269,620 | 5/1981 | Johansson | 75/11 |
| 4,282,032 | 8/1981 | Nagoya et al. | 75/80 |
| 4,292,075 | 9/1981 | Wolfsgruber et al. | 75/130 |
| 4,309,216 | 1/1982 | Merkert | 75/256 |
| 4,348,230 | 9/1982 | Aitcin et al. | 75/129 |
| 4,364,974 | 12/1982 | Lask | 427/213 |
| 4,366,137 | 12/1982 | Lask | 423/350 |
| 4,395,285 | 7/1983 | Merkert | 75/256 |
| 4,398,946 | 8/1983 | Doliwa | 75/30 |
| 4,410,502 | 10/1983 | Yamaguchi et al. | 423/345 |
| 4,482,512 | 11/1984 | Alsop | 264/29.1 |
| 4,497,661 | 2/1985 | Valenti | 75/256 |
| 4,504,453 | 3/1985 | Tanaka et al. | 423/345 |
| 4,515,763 | 5/1985 | Boudart et al. | 423/409 |
| 4,526,612 | 7/1985 | Eriksson et al. | 75/10 |
| 4,529,575 | 7/1985 | Enomoto et al. | 423/345 |
| 4,543,240 | 9/1985 | Goldberger | 423/346 |
| 4,571,331 | 2/1986 | Endou et al. | 423/345 |
| 4,613,363 | 9/1986 | Wienert | 75/10.62 |
| 4,642,135 | 2/1987 | Benecke et al. | 420/33 |
| 4,662,937 | 5/1987 | Katayama et al. | 75/80 |
| 4,851,203 | 7/1989 | Bachelard et al. | 423/290 |

SOLID STATE REACTION OF SILICON OR MANGANESE OXIDES TO CARBIDES AND THEIR ALLOYING WITH FERROUS MELTS

This application is a divisional of application Ser. No. 07/855,077, filed Mar. 23, 1992, now abandoned, which is a division of application Ser. No. 07/614,990, filed Nov. 13, 1990, now abandoned, which is a continuation of application Ser. No. 07/167,319 filed Mar. 11, 1988, now abandoned.

BACKGROUND OF THE INVENTION

The use of additives such as ferrosilicon and ferromanganese alloys is well known in the metallurgical arts. These materials are often sold in the form of master alloys, that is, alloys of these elements with iron in a relatively high alloy percentage (higher than that desired in a final product) for mixing with more iron or another iron alloy to provide the ultimately desired content of manganese or silicon.

These iron-silicon or -manganese alloys are made by various techniques including the use of blast furnaces and electric arc furnaces. In a conventional process for forming an iron master alloy, a metal oxide such as a manganese oxide or silicon oxide in coarse lump form is charged directly in combination with lump coke or coal into a furnace and heated to reduce the oxide and form molten silicon or manganese. This metal (including silicon which is technically a metalloid) is then mixed with an iron melt to form an iron alloy.

Silicon carbide is generally made by the Acheson process which involves the use of a silicon source such as sand or quartz and a carbon source such as coke breeze in an electric furnace. The heating times are very long and the resulting silicon carbide is relatively expensive, coarse and of mixed quality.

In these processes, the reduction reactions are in part between gas phases and the coarse lump material and in part between liquid metal and liquid slag. Chemical reaction rates are slow, requiring very large furnace size. Heat transfer to the reacting liquids is very difficult, requiring expensive electrical energy, and refractory demands are severe.

Unlike iron, which is fully reducible by carbon from the iron oxide to elemental metal without melting, silicon and manganese are reducible by carbon only at temperatures above their melting points. Thus, while agglomerates of finely divided iron oxide and carbon can be completely reduced in the solid state, similar agglomerates of silicon or manganese oxides will undergo melting and disintegration before reduction is complete and therefor require containment within a refractory vessel and the process in general reverts to a conventional liquid state reduction reaction process with slow reaction rate and expensive heating throughout the process. In addition, such processing normally dictates batch mode which further increases energy costs, material handling costs and decreases productivity.

OBJECTS AND SUMMARY OF THE INVENTION

It is an object of this invention to alleviate the problems of the prior art.

It is an object of this invention to provide a process for the low cost manufacture of iron based alloys containing manganese or silicon.

It is a further object of this invention to provide a process for forming silicon carbide or manganese carbide in a solid state reaction.

In one aspect of the present invention, there is provided a process for forming a metal carbide comprising silicon carbide or manganese carbide which comprises: forming a mixture of a finely divided carbonaceous material and a finely divided oxide of silicon or manganese; heating said mixture to a temperature below the melting point of the metal oxide to effect a solid state reaction forming the said metal carbide without melting any of the components or product; and the product of that process.

In another aspect of the present invention there is provided a process for forming a mixture of manganese oxide particles, said particles being 100 microns or less in average diameter, and particles of a carbonaceous material, said carbonaceous material particles being 150 microns or less in average particle diameter, said carbonaceous material being present in the mixture in an amount in excess of that necessary for direct reduction of the manganese from the oxide to the metal, into an agglomerate; passing said agglomerates and further carbonaceous material into a reactor and heating same at a temperature of from 1250° to 1500° C. for a time sufficient to convert substantially all of the manganese oxide to manganese carbide in a solid state reaction without melting any of the components or product.

In still another aspect of the present invention there is provided a process for producing alloys of iron and a metal selected from the group consisting of silicon, manganese and mixtures thereof comprising the steps of: forming a mixture of a finely divided carbonaceous material and a finely divided oxide of the alloying metal; heating said mixture and an iron metal source whereby the oxide of the alloying metal and finely divided carbon source react in the solid state to form a carbide of the alloying metal, the iron metal source melts to form molten iron, the said carbide thereafter dissolves in the said molten iron and the alloying metal forms an alloy with the iron.

DETAILED DESCRIPTION OF THE PREFERRED EMBODIMENTS

The essence of the present invention is the utilization of conditions such that a solid state reaction between silicon and/or manganese oxide can be used to form the corresponding silicon and/or manganese carbide. In regard to silicon and manganese, excess carbon, that is an excess in the amount necessary for reduction to metal but at least enough to form a carbide, is necessary in order to prevent the materials from melting in the reactor before reduction of the metal oxides. In addition, the use of excess carbon prevents fuming (which increases the yield and reduces environmental control costs), increases the reaction rate, provides low cost melt oxidation control and provides carburization and supplementary furnace fuel.

Figure 1:
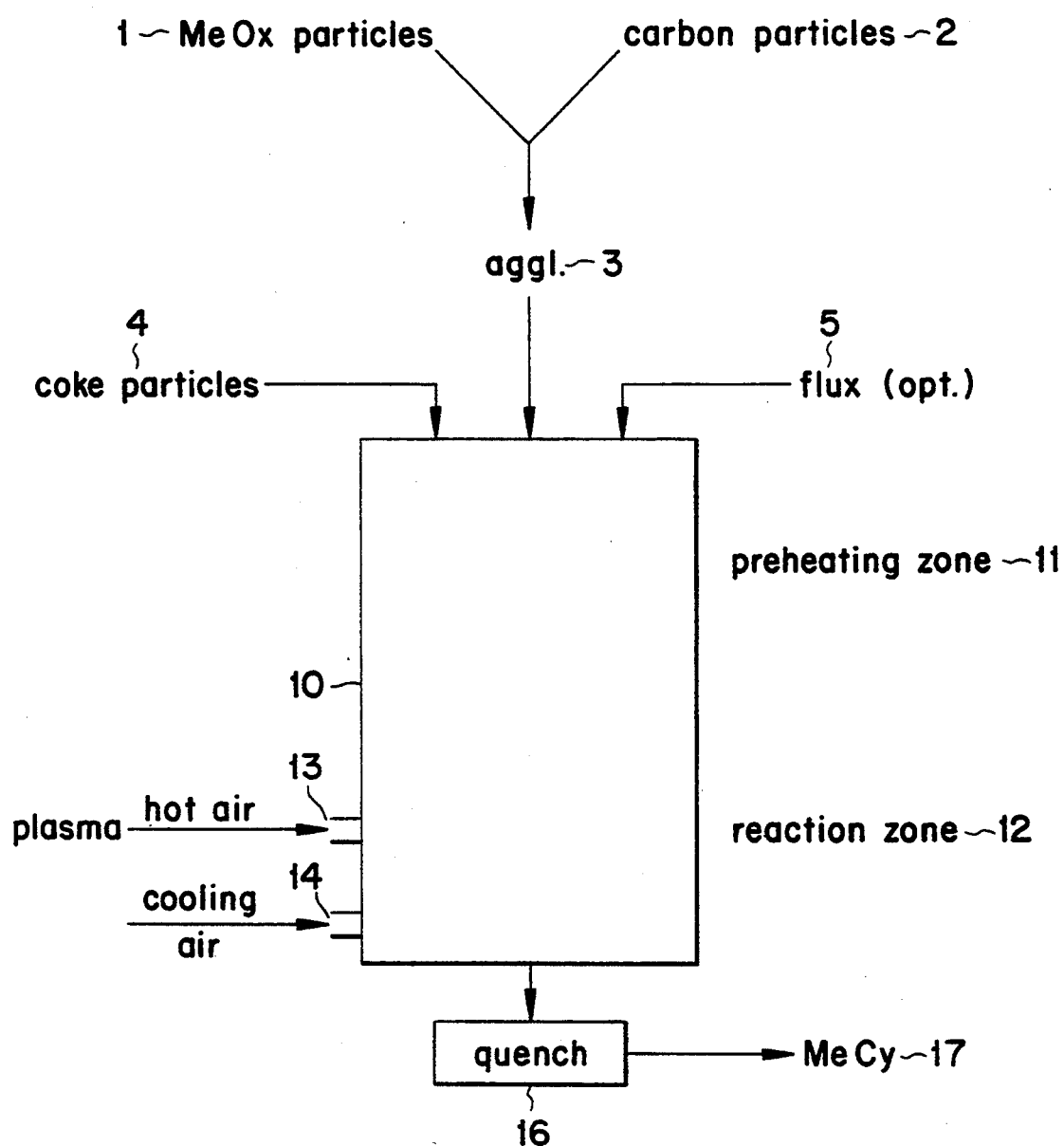
FIG. 1 is a schematic representation of one aspect of the present invention.

FIG. 1 is a schematic representation of the process which may be utilized to form silicon or manganese carbide.

As shown in the figure, particles of silicon oxide or manganese oxide 1 are mixed with carbon particles 2 to form agglomerates 3 which are then passed into the reactor vessel 10 along with coke particles 4 and, if desired, flux material 5. The silicon oxide or manganese oxide 1 can be any of the commonly available oxides. In one of the aspects of the present invention, the silicon oxide is sand, preferably used core or mold sand which is a waste byproduct of most foundries. This material is particularly advantageous in the process of the present invention because of its low cost and on-site availability to the iron foundry. Other sources of the silicon or manganese oxides may also be used.

The carbon particles can be coke (including char), calcined coal or other finely divided forms of carbon including coke breeze which is also often readily available as a by-product in the iron foundry. The carbon particles are mixed with the metal oxide in an amount which is stoichiometrically in excess of that required to form the metal carbide by direct reduction of the metal oxide. A particularly advantageous aspect of the invention is that the excess carbon mixed with the metal oxide is in effect used twice, that is, to accomplish two functions in the two-stage, iron alloy production. One is to maximize efficiency of oxide to carbide conversion (this occurs first), and the other (which occurs last) is improved melt oxidation control by maximally shifting oxidation control from silicon to carbon to reduce cost and metallurgical variability of the cast iron. The amount of excess carbon in the SiC+C aggregate that can be used this way can vary from about 1 to about 3 mole C per mole SiC and depends on temperature and dilution ratio of FeO in the melt slag, this ratio being in turn a function of the quality of iron metal (scrap and pig) and operating practice. When the SiC is formed in situ by this process, i.e., effectively by the reaction $$SiO_2 + 3C \rightarrow SiC + 3CO$$

the extra 1 to 3 moles of carbon is seen to equal 33% to 100% of stoichiometric requirements. Thus, in the case of silicon, generally at least 30%, preferably at least 50%, and in some cases 100% excess carbon source is desired. In the case of manganese, at least 2½%, preferably at least 5% and in some cases 10% excess carbon, is desired.

The carbon particles 2 should be finely divided so as to provide sufficient carbon surface for the reaction of gaseous metal oxide, that is about 150 or less, preferably about 75 or less, most preferably about 50 or less, microns. Preferably, the carbon particles are also porous so as to provide even further carbon surface. Optimally, the metal oxide vapors which are generated at a rate determined jointly by metal oxide particle size and temperature are consumed by carbide conversion at a rate as fast as that generation rate.

The metal oxide particles 1 preferably should be of a size to provide sufficient reactivity at the reaction temperature without undue (i.e., more than 5%) loss by fuming. These particles are somewhat finer than the carbon particles and can be in the range of about 100 or less, preferably 75 or less, most preferably about 50 or less, microns.

As noted, the metal oxide particles 1 and carbon particles 2 are preferably formed into agglomerates 3 prior to being passed into the reactor 10. The agglomerate 3 can contain a bonding agent such as the oxides, hydroxides and carbonates of calcium and magnesium and mixtures thereof with lime and/or hydrated lime being the most preferred as set forth in U.S. Pat. No. 3,770,416 and related patents such as U.S. Pat. Nos. 4,580,029; 4,412,840; and 4,239,530, all to Goksel. Sodium silicate or portland cement are also possible binding agents. The agglomerates 3 shall be of suitable size such that their movement in the reactor vessel 10 matches that of the coke particles 4, that is, interstitial flow of the agglomerates 3 through the coke particles 4 is precluded and additionally that the agglomerates shall have a sufficient size distribution and eccentricity as to provide for minimum resistance to gas flow. Generally the agglomerate should be egg-shaped with a ratio of diameters of major axis to minor axis of from about 1.05 to about 1.2 although spherical particles (major to minor diameter ratio: 1 to 1) may also be utilized. The use of slightly egg-shaped pellets increases the void space and relieves the back pressure of gas in the reactor vessel 10. The agglomerates may also be briquetted cubes or any other shape or cut extrusions of any convenient cross section. The agglomerates 3 generally have a size of from 10 to about 100, preferably from about 25 to about 40, mm.

The coke particles 4 may advantageously be blast furnace (or metallurgical) coke which are generally non-spherical, e.g., rectangular- or cubic-shaped, particles having major dimensions of from 25 to 50 millimeters. The coke particles 4 are advantageously slightly larger than the agglomerates 3 but the particular size of the agglomerates 3 may be chosen in accordance with the above characteristics.

The agglomerates 3 are mixed with coke particles 4 and the optional, and conventional flux material 5 (such as, for example, limestone) in a preheating zone generally indicated as 11 in reactor 10. The particles travel downwardly through the reactor into reaction zone 12. Just below the reaction zone 12, a high temperature heat source such as a plasma heated gas is injected at inlet 13 into the reactor along with hot air to provide the reaction zone 12 with the proper temperature. Heat from the reaction zone 12 travels upwardly into the preheating zone 11. The amount of heat and hot air added as well as the residence time in the reaction zone 12 is dependent on the materials. That is, silicon oxides in the case of alloying iron will generally be sized to react in the range of from about 1530 to 1800, preferably from about 1550 to 1750, most preferably from about 1580° to 1700° C. (temperatures higher than those indicated will require more excess carbon to prevent excessive fume formation) while the manganese oxides react at a temperature of from about 1250 to 1500, preferably from about 1300 to 1450, most preferably from 1325° to 1375,° C. The reaction temperature is dependent on the particle size, that is, in general, the finer the particle size of these oxides, the lower the reaction temperature can be within the range to effect the reaction of the silicon and manganese oxides. The reactants are maintained in the reaction zone for a time sufficient to convert the silicon or manganese oxide to the corresponding carbide without exceeding the melting point of any of the components or the product. Thus, there is a solid state reaction between these materials which offer significant benefits to the overall process as described below. In the case of silicon carbide production for non-metallurgical use (ceramic or abrasive industries), the reactor is controlled to provide a post-formation heating of the reacted product to about 2200° C. in order to convert from beta to alpha (the more desired form) silicon carbide.

Below the plasma and hot air input 13, cooling air 14 is admitted into the reaction chamber to cool the reactive particles which then exit the vessel 10 through an exit generally indicated 15 into a quenching unit 16 which can be a water quench of conventional type from which the manganese or silicon carbide particles (generally indicated as 17) can be recovered. These particles have utility in the formation of iron alloys and may be utilized in any other situation in which such material is desired. For example, silicon carbide particles are of significant interest in the ceramics industry.

Generally, the temperature of the solids in the preheating zone is from about 200° to 500° C. and the coke which is added is used as fuel in the process. The plasma heated gas is at 1000° C. or higher with the hot air being approximately 500° C. The plasma can provide all of the necessary heat in reactor vessel 10 (in which case the amount of coke particles 4 can be reduced or even eliminated). The cooling air which enters the bottom of the reactor also burns excess carbon off the surface or interior of the particles. It has been found that the agglomerates of the silicon carbide or manganese carbide have a greater porosity than that of commercially available silicon carbide pellets derived, for example, from Acheson process material. In addition, the individual silicon or manganese carbide particles within the resulting agglomerates may contain a controlled amount of unreacted carbon at the center of some (or all) of the particles. Whether such carbon centers remain is primarily a function of the residence time within the reactor. For utilization in, for example, a solid state reaction forming an iron alloy such as carburizing a powder metal compact or for the liquid state refinement of iron alloy such as inoculation of cast iron, this carbon presence will be generally beneficial in amounts of up to 50% by weight of the particle. In those cases in which it is not desired, more complete reaction, e.g., longer residence time, will remove substantially all the carbon from the particles of the agglomerate.

Figure 2:
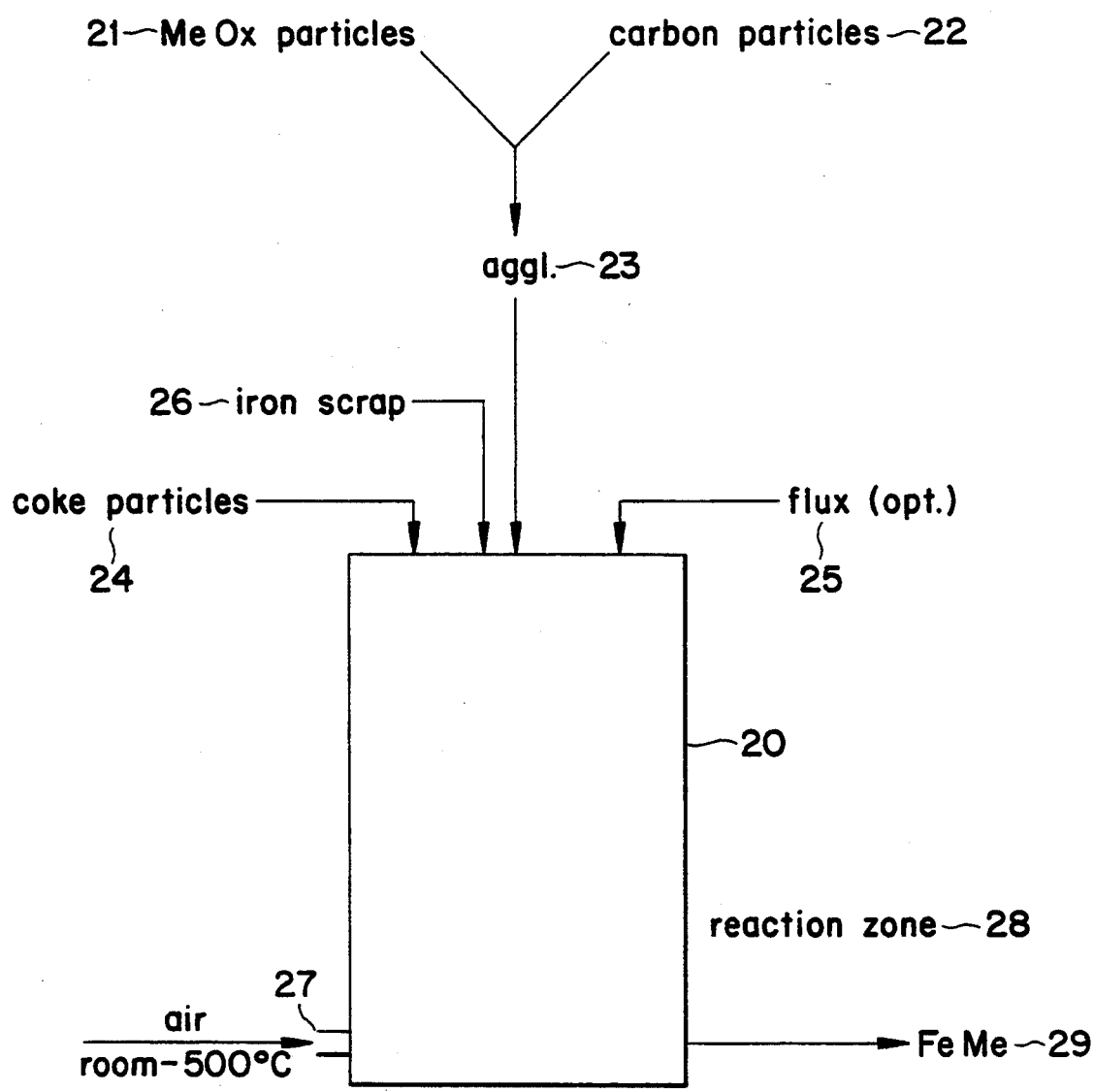
FIG. 2 is a schematic representation of a further aspect of the present invention.

In FIG. 2, there is shown a schematic representation of a reactor 20 which may be used for the direct formation of an iron-manganese or iron-silicon alloy including the intermediate carbide solid state reaction.

In FIG. 2, the metal oxide particles 21 and 22 represent the same materials as in FIG. 1 identified as 1 and 2, respectively. Again, these particles are formed into agglomerates 23 of the same type, size and in the same manner as agglomerates 3 in FIG. 1. Coke particles 24 are added to the reactor vessel 20 along with the optional flux 25. However, in this embodiment, an iron source 26 which is a source of iron metal, such as iron scrap, pig iron or iron alloys, is also added. Generally, in the iron-silicon case the charge to the vessel 20 will include a load portion comprising approximately 85 to 96, preferably about 92 to 95%, (by weight) iron source and about 4 to 15, preferably about 5 to 8, % (by weight) of the agglomerates plus working material of about 7 to 14, preferably about 8 to 12, % (by weight of the load portion) of coke and up to 2, generally about 1, % (by weight) of flux. It is possible in a particular embodiment of the invention to incorporate sufficient lime or other fluxing material into the metal oxide-carbon agglomerates to meet all fluxing requirements whereby no flux will be required in the furnace (reactor) charge. Since the coke is substantially lower in weight than that of the other materials, it generally constitutes about 15 to 35 volume percent of the overall (load portion plus working material) charge. In the iron-manganese case, the load portion may be up to 99, but is preferably for ferromanganese alloy production from about 0 to about 10, % by weight iron source and concomitantly at least about 1, and in the ferromanganese alloy production preferably from about 90 to about 100% by weight of the agglomerates. The working material is the same as in the iron-silicon case.

Air is added through an inlet 27 into the reactor 20 to burn the coke particles to fuel the process. If desired, a plasma heating gas may also be used to provide heat. The gas temperature in the reaction zone will generally be in the neighborhood of 1700° to 2200° C.

In this aspect of the invention, while the formation of the metal carbide is in the solid state (as described above with reference to FIG. 1), the iron metal source 26, e.g., iron scrap or pig iron, melts to form molten iron in the reaction zone at a temperature of about 1300° to 1500° C. The silicon carbide and/or manganese carbide formed by the solid state reaction dissolves in the molten iron and the silicon or manganese alloys with the iron. Thus, the product 29 taken from the reactor 20 is an iron alloy containing silicon in an amount of about 1 to 5 weight percent or manganese in an amount of up to about 80 weight percent.

While the air entering through inlet 27 in the reaction can be at room temperature, preheating of the air by conventional preheating means saves on the amount of coke needed to reach the reaction temperature.

Although the above has been described with respect to the utilization of manganese oxides or silicon oxides, various mixtures of these oxides may also be used and, with certain limitations, mixtures with other oxides may be used. For example, an iron oxide-containing silicon oxide should not normally be used in the process of the present invention because too much iron oxide (e.g., above about 2 percent by weight) causes the pellet to melt and disintegrate. Therefore, such iron oxide-containing silicon oxides are not normally desired (however, when available silicon oxide materials are contaminated with iron oxide in amounts above 2% by weight of the pellet, up to about 5% iron oxide may be accommodated by adding lime in an amount equal to the excess iron oxide over 2%).

When utilizing manganese oxide, iron ore sources which include iron oxides may be used. While the presence of high amounts of iron with silicon oxides are as described above not acceptable, iron and manganese form combined carbides of greater stability than iron carbide alone (the opposite of silicon carbide). Also, manganese carbide solubility in liquid iron is very high so iron master alloys containing as high as 70 to 80 percent manganese can be easily made.

The utilization of the two stage reduction from a carbon bearing-metal oxide agglomerate to a metallic alloy by the utilization of an intermediate carbide formation in the overall reduction process has a number of advantages, and is necessary for silicon and manganese since the intermediate carbide formation is essential to the solid state reaction. In particular, the use of this process for silicon and manganese gives fast solid state reactions with a minimum environmental effect. The intermediate product (the silicon carbide or manganese carbide product) is readily shippable. In addition, the product can be made using low cost ores and carbon and waste product material such as molding sand, furnace dust, coke breeze, carbon fines, etc. The ultimate iron alloy as produced is useful as an inoculant for cast iron and may be used in the simultaneous refinement and carburization of cast iron or steel. In addition, the process of the present invention may be conducted in conventional reactor vessels such as shaft furnaces, cupolas or the like. The processes of the present invention utilize lower process temperatures than conventionally available processes and have less loss and therefore higher yield of the materials.

The agglomerates of the present process completely self reduce in a few minutes when heated in a furnace. Furnace size is only about one fifth for equivalent production by this method compared with traditional processes and no liquid state reduction reactions are required.

The principles, preferred embodiments and modes of operation of the present invention have been described in the foregoing specification. The invention which is intended to be protected herein, however, is not to be construed as limited to the particular forms disclosed, since these are to be regarded a illustrative rather than restrictive. Variations and changes may be made by those skilled in the art without departing from the spirit of the invention.

I claim:

1. A process for forming an iron containing alloy comprising (1) combining manganese oxide or silicon oxide with a stoichiometric excess of carbon and an iron metal source in a vertical shaft furnace, (2) heating said combination to a temperature and for a sufficient amount of time to convert substantially all of said oxide in the solid state to a carbide and then (3) forming an alloy in said furnace by dissolving said carbide in molten iron.

2. The process of claim 1, wherein said carbon and said oxide of manganese or silicon is formed into agglomerates prior to heating.

3. The process of claim 1, wherein the carbon is calcined coal or coke having a particle size of about 150 microns or less.

4. The process of claim 1, wherein the oxide of manganese or silicon has a particle size of 100 microns or less.

5. The process of claim 1, wherein the alloying metal is manganese.

6. The process of claim 5, wherein the manganese oxide source includes an iron metal source.

7. The process of claim 1, wherein the iron metal source comprises at least partly iron or steel scrap.

8. The process of claim 7, wherein the iron metal source comprises at least partly pig iron.

9. The process of claim 1, wherein said oxide is silicon oxide and the said carbon is present in an amount of up to about 100% excess of that stoichiometrically required for direct reduction of the oxide to the carbide.

10. The process of claim 1, wherein said oxide is manganese oxide and said carbon is present in an amount of up to about 10% excess of that stoichiometrically required for direct reduction of the oxide to the carbide.

11. The process of claim 2, wherein said alloying metal is manganese and said agglomerates and iron metal source are heated to a temperature of from about 1250° to about 1500° C.

12. The process of claim 2, wherein said alloying metal is silicon and agglomerates and iron metal source are heated to a temperature of from about 1530° to about 1800° C.

13. The process of claim 1, wherein oxidation of a carbonaceous material provides at least part of said heating.

14. The process of claim 1, wherein air is introduced into a reaction zone in said furnace where said oxide is converted to a carbide in the solid state.

15. The process of claim 14, wherein a plasma heated gas is introduced into said reaction zone.

16. A process for forming a ferro-manganese alloy comprising:
   (1) forming a mixture of manganese oxide particles, said particles being 100 microns or less in average diameter, and particles of a carbonaceous material, said carbonaceous material particles being 150 microns or less in average particle diameter, said carbonaceous material being present in the mixture in an amount in excess of that necessary for direct reduction of the manganese from the oxide to the metal carbide, into an agglomerate;
   (2) passing said agglomerates, an iron metal source, and further carbonaceous material into a reactor and heating same at a temperature and for a time sufficient to convert substantially all of the manganese oxide to manganese carbide in a solid state reaction;
   (3) forming an alloy in said reactor by dissolving said carbide in molten iron; and
   (4) removing said alloy from said reactor.

17. A process for forming a ferro-silicon alloy comprising:
   (1) forming a mixture of silicon oxide particles, said particles being 100 microns or less in average diameter and particles of a carbonaceous material, said carbonaceous material particles being 150 microns or less in average diameter, said carbonaceous material being present in the mixture in an amount in excess of that necessary for direct reduction of the silicon from the oxide to the metal carbide, into an agglomerate;
   (2) passing said agglomerates, an iron metal source and further carbonaceous material into a reactor and heating same at a temperature and for a time sufficient to convert substantially all of the silicon oxide to silicon carbide in a solid state reaction;
   (3) forming an alloy in said reactor by dissolving said carbide in molten iron; and
   (4) removing said alloy from said reactor.

* * * * *